United States Patent
Linde

(10) Patent No.: US 9,020,433 B2
(45) Date of Patent: Apr. 28, 2015

(54) LOW POWER WIRELESS DEVICE DISCOVERY

(75) Inventor: Joakim Linde, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 542 days.

(21) Appl. No.: 13/253,939

(22) Filed: Oct. 5, 2011

(65) Prior Publication Data

US 2013/0090061 A1   Apr. 11, 2013

(51) Int. Cl.
*H04B 7/00* (2006.01)
*H04W 8/00* (2009.01)
*H04W 52/02* (2009.01)
*H04W 84/18* (2009.01)

(52) U.S. Cl.
CPC .......... *H04W 8/005* (2013.01); *H04W 52/0216* (2013.01); *H04W 84/18* (2013.01); *H04W 52/0229* (2013.01); *H04M 2250/02* (2013.01)

(58) Field of Classification Search
USPC .......... 455/41.2, 41.1–41.3, 414.1, 450, 574, 455/552.1, 39, 418
See application file for complete search history.

(56) References Cited

U.S. PATENT DOCUMENTS

| | | | |
|---|---|---|---|
| 7,613,484 B2* | 11/2009 | Lappeteläinen et al. | 455/574 |
| 8,005,465 B2* | 8/2011 | Salokannel et al. | 455/414.1 |
| 2006/0154691 A1* | 7/2006 | Tang et al. | 455/552.1 |
| 2008/0109302 A1* | 5/2008 | Salokannel et al. | 705/14 |
| 2010/0062746 A1* | 3/2010 | Proctor et al. | 455/411 |
| 2010/0317289 A1 | 12/2010 | Desai et al. | |
| 2011/0021142 A1 | 1/2011 | Desai et al. | |
| 2011/0153818 A1* | 6/2011 | Vandwalle et al. | 709/224 |
| 2011/0319020 A1* | 12/2011 | Desai et al. | 455/41.2 |
| 2013/0040573 A1* | 2/2013 | Hillyard | 455/41.2 |

OTHER PUBLICATIONS

PCT International Search Report & Written Opinion of the International Searching Authority for PCT/US2012/058633 mailed Jan. 25, 2013.
Specification of the Bluetooth System, Experience More, Specification vol. 6, Core System Package [Low Energy Controller Volume], Covered Core Package Version: 4.0, Bluetooth, XP055016390, retrieved from the Internet: URL: https://www.bluetooth.org/Technical/Specifications/adopted.htm, retrieved on Jan. 12, 2012.

* cited by examiner

*Primary Examiner* — Ganiyu A Hanidu
(74) *Attorney, Agent, or Firm* — Park, Vaughan, Fleming & Dowler LLP

(57) ABSTRACT

An efficient wireless connection protocol is described.

15 Claims, 6 Drawing Sheets

LOW POWER WIRELESS DEVICE DISCOVERY

BACKGROUND

1. Field of the Invention

The described embodiment relates to low power wireless devices. In particular, an efficient connection protocol is described.

2. Description of the Related Art

The Bluetooth low energy (BLE) is a specification that enables radio frequency communication operating within the globally accepted 2.4 GHz Industrial, Scientific & Medical (ISM) band. The BLE specification supports a physical layer bit rate of 1 Mbit/s over a range of about 50 meters. The BLE wireless technology specification features two implementations, namely "dual-mode" and "single-mode". The dual-mode implementation is targeted at mobile devices and personal computers. The single-mode implementation is power and cost optimized. The single-mode implementation features a lightweight Link Layer (LL) providing ultra-low power idle mode operation, simple device discovery and reliable point-to-multipoint data transfer with advanced power-save and encryption functionalities. The single-mode implementation is targeted at, for example, small, button-ell battery powered devices in, for example, sports and wellness, health-care, entertainment and toys and mobile accessories product categories. In this way, BLE offers a low power alternative to providing a wireless connection between multiple devices.

However, in order to maintain the low power characteristic of BLE, providing an efficient connection protocol is desired.

SUMMARY

Broadly speaking, the embodiments disclosed herein describe methods, apparatus and materials for providing an efficient connection protocol for a wireless device.

In one embodiment, a method of processing signals is described. The method can be performed by a wireless peripheral device. In one embodiment, the method is performed by one or more processors and/or circuits in a Bluetooth low energy (BLE) device by carrying out at least the following operations: identifying a set of advertising packet issuance timing parameters, issuing an advertising packet in accordance with the advertising packet issuance timing parameters, and modifying the advertising packet issuance timing parameters when the BLE device does not receive a valid connection command in response to the issued advertising packet.

In one aspect of the described embodiment, the modifying of the advertising issuance is in accordance with $$advIntervalH = \frac{scanInterval * N + 1.5 * scanWindow}{M} - \frac{advDelay}{2},$$

$$advIntervalL = \frac{scanInterval * N - 1.5 * scanWindow}{M} - \frac{advDelay}{2}$$

wherein N, M are natural integer numbers each having an integer value of at least 1 and wherein scanInterval is an amount of time corresponding to a scan interval and wherein scanWindow is an amount of time corresponding to a scan window each being associated with a central device In another embodiment, a wireless peripheral device includes at least a wireless interface and a processor coupled to the wireless interface. In the described embodiment, the processor is arranged to execute computer code for identifying a set of advertising packet issuance timing parameters, issuing an advertising packet in accordance with the advertising packet issuance timing parameters, and modifying the advertising packet issuance timing parameters when the BLE device does not receive a valid connection command in response to the issued advertising packet.

In yet another embodiment, non-transitory computer readable medium for storing computer code executable by a processor for processing signals includes at least computer code for performing by one or more processors and/or circuits in a Bluetooth low energy (BLE) device: computer code for identifying a set of advertising packet issuance timing parameters, computer code for issuing an advertising packet in accordance with the advertising packet issuance timing parameters, and computer code for modifying the advertising packet issuance timing parameters when the BLE device does not receive a valid connection command in response to the issued advertising packet.

Other aspects and advantages will become apparent from the following detailed description taken in conjunction with the accompanying drawings which illustrate, by way of example, the principles of the invention.

BRIEF DESCRIPTION OF THE DRAWINGS

The described embodiments will be readily understood by the following detailed description in conjunction with the accompanying drawings, wherein like reference numerals designate like structural elements, and in which.

DETAILED DESCRIPTION OF THE DESCRIBED EMBODIMENTS

Figure 1:
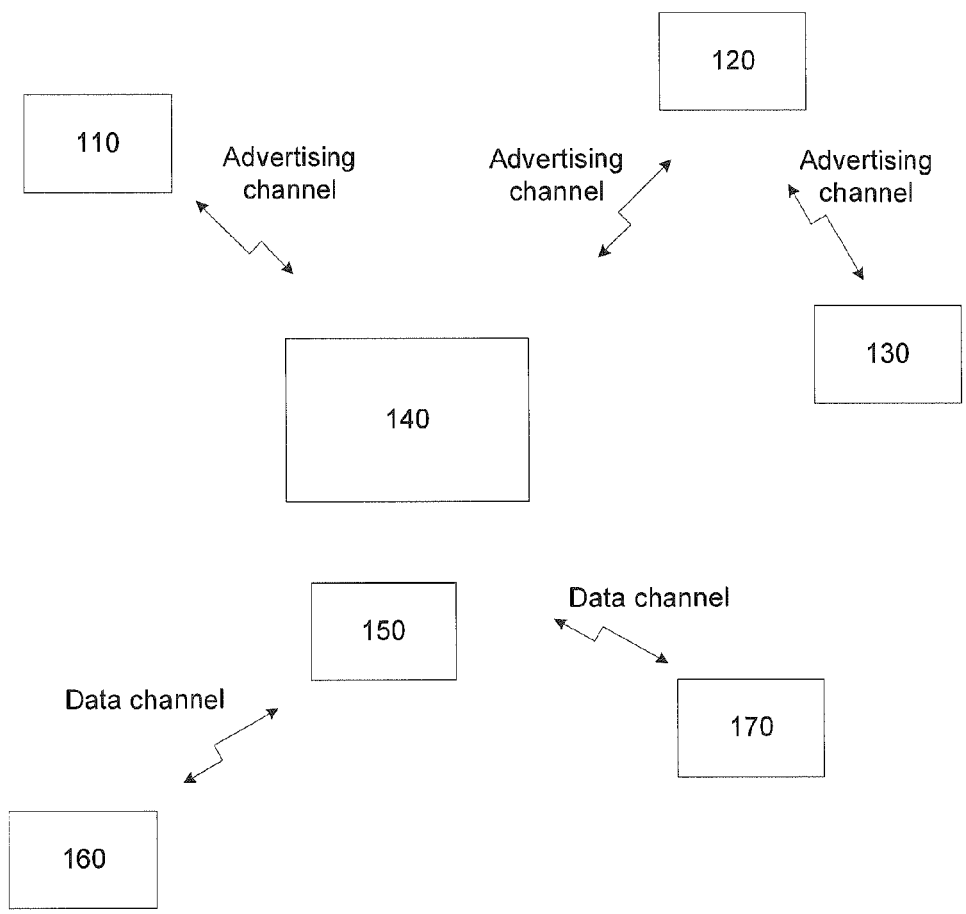
FIG. 1 is a diagram illustrating an exemplary Bluetooth Low Energy (BLE) communication system in accordance with a described embodiment.

In the following detailed description, numerous specific details are set forth to provide a thorough understanding of the concepts underlying the described embodiments. It will be apparent, however, to one skilled in the art that the described embodiments can be practiced without some or all of these specific details. In other instances, well known process steps have not been described in detail in order to avoid unnecessarily obscuring the underlying concepts.

These and other embodiments are discussed below with reference to FIGS. 1-6. However, those skilled in the art will readily appreciate that the detailed description given herein with respect to these figures is for explanatory purposes only and should not be construed as limiting.

An efficient wireless connection protocol is described. The efficient wireless connection protocol is particularly well suited for wireless communication systems that rely upon low energy wireless protocols such as Bluetooth Low Energy (BLE). BLE is typically used for providing a communication channel between a battery powered peripheral device (such as a heart monitor, sensor, etc.) and central device (such as a Smartphone along the lines of the iPhone™ manufactured by Apple Inc. of Cupertino, Calif.). In this way, power can be conserved in both the central device and the peripheral device thereby greatly extending the usefulness of the wireless system.

In one embodiment, a peripheral device can attempt to form a wireless connection with a central device by periodically broadcasting a connection request signal. In the context of BLE the peripheral device will periodically broadcast what is referred to as advertising packets each being separated by an amount of time referred to as an advertising interval. Once the peripheral device has issued the advertising packet, the peripheral device will wait for an appropriate response from a central device that has received and appropriately processed the advertising packet. If the peripheral device has not received the appropriate response during the advertising interval, the peripheral device will issue another advertising packet until either an appropriate response is received or a time out is called. In the described embodiment, the central device is configured to operate in a listening mode where for a period of time, referred to as a scan window; reception of advertising packets is possible. However, since the central device does not know apriori if a peripheral device is in fact attempting to establish a wireless connection, in order to reduce power consumption and allow for the BLE antenna to be shared with other RF technologies, such as WiFi. The scan window is only open for a limited amount of time referred to as a scan interval. It should be noted that since there is generally no specific arbitration protocol in place between the central device and what may be a number of peripheral devices all attempting to establish a wireless connection with the central device, collisions can be prevented by adding an amount of time referred to as an advertising delay (advDelay) to the advertising interval. Generally, the advertising delay randomly ranges from 0 to about 10 ms (with an average of about 5 ms).

Therefore, the amount of time (and associated power) required establishing a wireless connection between the peripheral device and the central device can be dependent upon many factors. Such factors can include, for example, the amount of time associated by the scan window and scanning interval and the relationship to the amount of time associated with the advertising window, advertising interval, and advertising delay. Moreover, in order to optimize a most likely time required to establish a wireless connection between the central device and the peripheral device, the embodiments herein describe a technique whereby the peripheral device can actively modify the number of advertising packets broadcast by the peripheral device for each scan interval. In addition to the number of advertising packets broadcast per scan interval, an issuance time within the scan interval associated with an advertising packet can be modified. In the described embodiment, the peripheral device will attempt to use an optimal advInterval resulting a substantially shortened discovery time and reduced power consumption. However, battery lifetime may put restrictions on how often the sensor can send out an advertising packet.

More specifically, the relationship between an amount of time associated with a advertising interval and the scan interval, scan window, and advertising delay can be in a range represented by Eq. (1) and Eq. (2):

$$advIntervalH = \frac{scanInterval * N + 1.5 * scanWindow}{M} - \frac{advDelay}{2};$$ Eq. (1)

$$advIntervalL = \frac{scanInterval * N - 1.5 * scanWindow}{M} - \frac{advDelay}{2};$$ Eq. (2)

where M and N are natural numbers (1, 2, 3 . . . ).

In one embodiment, the values of scanInterval and scanWindow can be default values associated with a standard set of values. For example, in one situation, scanInterval and scanWindow can take on default values of about 40 ms and 60 ms, respectively. However, in some cases, these values can change based upon, for example, an amount of elapsed time, a power status of a power supply of the central device, and so on. Therefore, by carefully selecting the timing parameters used to complete a wireless connection, the time required and the amount of power consumed can be substantially reduced.

FIG. 1 is a diagram illustrating an exemplary Bluetooth Low Energy (BLE) communication system that is operable to support BLE activities in accordance with an embodiment of the invention. Referring to FIG. 1, there is shown a Bluetooth low energy (BLE) communication system 100 that includes at least a plurality of BLE devices such as advertisers 110-120, a scanner 130, initiator 140, master device 150, and slave devices 160-170. BLE communication system 100 can be operable to utilize a frequency division multiple access (FDMA) scheme and a time division multiple access (TDMA) scheme to support voice and/or data communication. BLE communication system 100 can be configured to divide a plurality of physical channels, for example, 40 physical channels, into advertising channels and data channels per FDMA scheme. In advertising channels, a BLE device can function in a role as an advertiser, a scanner, or an initiator. In data channels, a BLE device can play a role as a master or a slave. BLE communication system 100 can be enabled to utilize a TDMA based polling scheme in link layer communications between the master device 150 and the slave devices 160-170.

An advertiser such as the advertiser 120 can include suitable logic, circuitry and/or code that can be enabled to broadcast advertisements periodically in advertising channels. Advertiser 120 can be configured to advertise service and/or availability for a link layer connection. Advertiser 120 can be enabled to transmit advertising packets within advertising events. An advertising event can begin with the presence of an advertising packet sent by advertiser 120. Advertiser 120 can be operable to determine whether or not a received request to be processed according to a white list. The white list can include a list of, for example, 48 bit Bluetooth low energy device addresses of preferred BLE devices.

Scanner 130 can include suitable logic, circuitry and/or code that can be operable to search for advertising BLE devices within range. Scanner 130 can be configured to perform a passive scan or an active scan. In a passive scan, scanner 130 can be enabled to listen for advertising packets and can not transmit messages to advertisers. In an active scan, scanner 130 can request an advertiser to transmit additional information that can not be available in the received advertising packets. Scanner 130 can be operable to select a scan interval and a scan window for a scanning process. Scanner 130 can be operable to discover information about available advertisers in a local area. Scanner 130 can be configured to use a white list for device filtering. The scanner 130 can be enabled to process advertising packets from advertisers in the white list. The white list can comprise a list formed by device class bits of preferred BLE devices. Scanner 130 can be enabled to use the white list for device filtering based on device class bits other than 48-bit Bluetooth low energy device addresses. Scanner 130 can be operable to set control scan windows in order to reduce power consumption. For example, scanner 130 can be operable to vary both an amount of time associated with a scan interval and a scan window. The variation can be associated with, for example, an amount of elapsed time where no advertising packets have been detected, available power and battery level status and so on.

Figure 2:
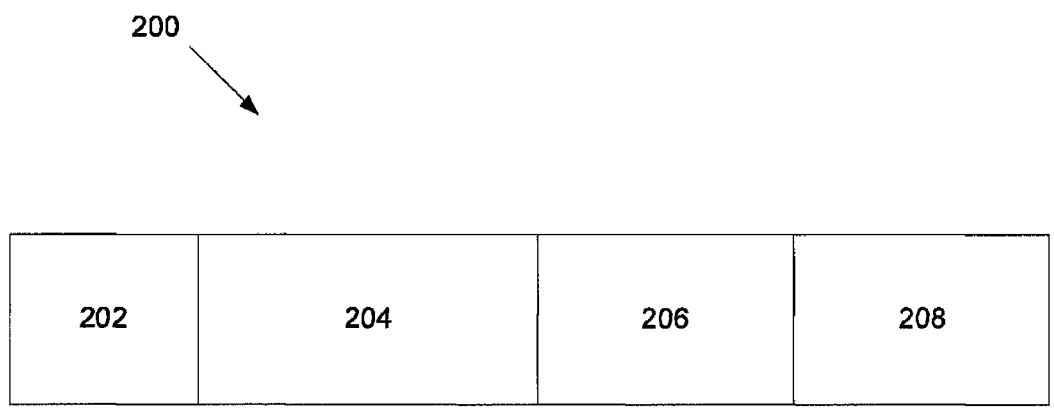
FIG. 2 is a diagram illustrating an exemplary Bluetooth Low Energy (BLE) air interface packet structure, in accordance with an embodiment of the invention.

FIG. 2 is a diagram illustrating an exemplary Bluetooth Low Energy (BLE) air interface packet structure, in accordance with an embodiment of the invention. Referring to FIG. 2, there is shown a BLE packet 200 that includes a preamble 202, an access address 204, a Protocol Data Unit (PDU) 206, and a CRC 208. The preamble 202 may comprise eight bit long sequence of either '10101010' or '01010101'. An advertising channel packet may use '01010101' as the preamble 202. The preamble 202 may comprise either '10101010' or '01010101' for a data channel packet. The preamble 202 may be used by a BLE receiver such as the initiator 140 to perform frequency synchronization, symbol timing estimation, and gain control training. The access address 204 may comprise a 32-bit value.

The PDU 206 may comprise actual data and/or control information such as, for example, a 48-bit device address, from higher layers. The PDU 206 may be in a variable size ranging from 2 to a maximum of 39 octets. The leftmost bit may be transmitted first. For packets in advertising channels such as advertising packets, initiator packets, and/or scanning packets, the PDU 206 may comprise device addresses such as advertiser address, initiator address, or scanner address, respectively. A device address is a unique 48-bit BLE device address that includes key bits for corresponding device class. When device filtering used, the receiver may be enabled to utilize device class bits of corresponding device address such as advertiser address, initiator address, or scanner address for device filtering.

The cyclic redundancy check (CRC) 208 may be appended to the PDU 206 with the BLE *packet* 200 to allow integrity verification. The CRC 208 may be calculated on the PDU 206. The CRC 208 may be utilized at a receiver to determine whether the PDU 206 may be in error. For example, upon the reception of the BLE packet 200, a local CRC may be calculated on the PDU 206 to be compared with the CRC 208 in the BLE packet 200. A mismatch between the local CRC and the CRC 208 may lead to a CRC error. Two consecutive packets received with CRC error within a connection event may cause a corresponding connection closed event.

Figure 3:
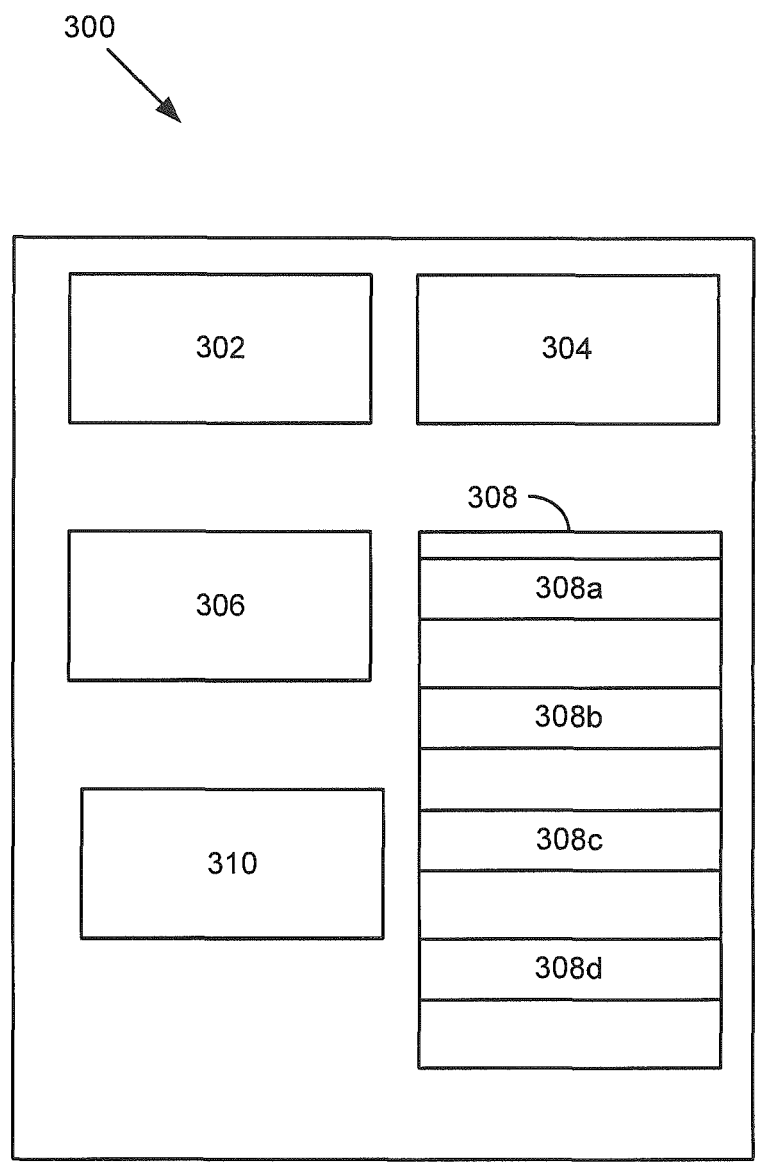
FIG. 3 is a diagram illustrating a representative BLE peripheral device in accordance with an embodiment of the invention.

FIG. 3 is a diagram illustrating a representative BLE peripheral device in accordance with an embodiment of the invention. Referring to FIG. 3, there is shown BLE peripheral device 300 that includes a BLE module 302. In some embodiments, peripheral device 300 can be a dual mode type peripheral device that supports both BLE and standard BT in which case peripheral device 300 includes BT module 304. The BT module 304 may comprise suitable logic, circuitry, interfaces and/or code that may be enabled to transmit and/or receive signals. In any case, peripheral device 300 also includes a processor 306, a user interface 308, and a memory 310. The user interface 308 may comprise a display 308a, a speaker 308b, a microphone 308c, and a keyboard 308d. The BLE module 302 may comprise suitable logic, circuitry, interfaces and/or code that may be enabled to transmit and/or receive signals over BT low energy air interface and communicate with the processor 306 for further processing. The processor 306 may comprise suitable logic, circuitry, interfaces and/or code that may be enabled to perform a variety of signal processing tasks associated with the BLE module 302 and/or the BT module 304. The processor 306 may comprise controlling of the BLE module 302 as well as the BT module 304. In this regard, the processor 306 may be enabled to support BLE advertising activities and Bluetooth BR/EDR traffic communications simultaneously. The processor 306 may be enabled to perform BLE advertising activities. The user interface 308 may comprise suitable logic, circuitry, interfaces and/or code that may be enabled to service the peripheral device 300 via entering user inputs and/or presenting various services to users. The user interface 308 may comprise a plurality of associated components such as the display 308a, the speaker 308b, the microphone 308c, and the keyboard 308d. The display 308a may enable presentation or display graphics and/or text to users. Services implemented via the BLE module 302 and/or the BT module 304 may be presented to users as image data on the display 308a and/or as voice via the speaker 308b, for example, by pressing the keyboard 308d and/or generating an audio indication through the microphone 308c.

The memory 310 may comprise suitable logic, circuitry, interfaces and/or code that may enable storage of data and/or other information utilized by the processor 306. For example, the memory 308 may be utilized to store communication data on the BLE module 302 and/or the BT module 304. The memory 310 may be enabled to store executable instructions for starting or stopping BLE advertising. The memory 310 may be enabled to store algorithms to, for example, calculate the size of advertising packets and frequency of advertising packets. The memory 310 may comprise RAM, ROM, low latency nonvolatile memory such as flash memory and/or other suitable electronic data storage capable of storing data and instructions.

Figure 4A:
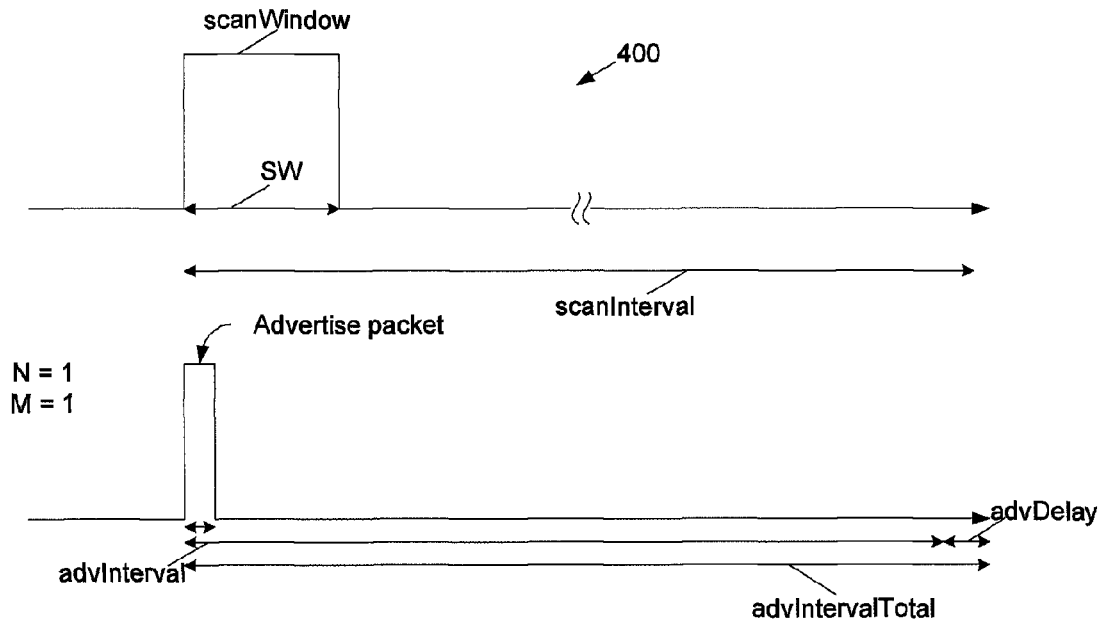
FIGS. 4A-4C shows representative timing diagrams in accordance with Equation (1) above.
Figure 4B:
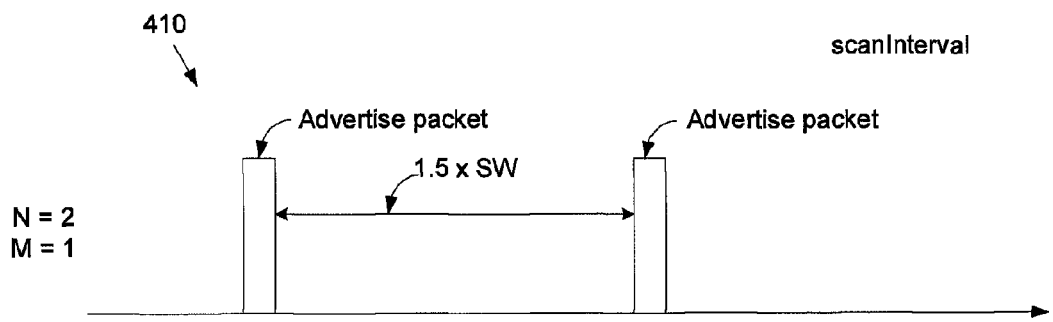
Figure 4C:
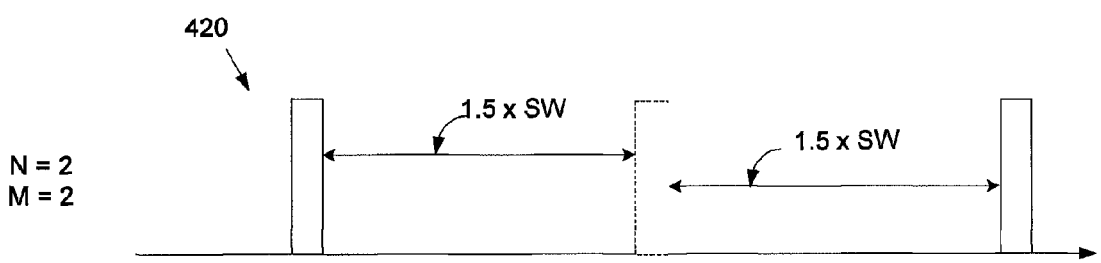

FIGS. 4A-4C shows representative timing diagrams in accordance with the described embodiments as embodied by Equation (1) and (2) above. The timing diagrams show a relationship between in one embodiment, timing characteristics of a central device and at least one peripheral device such as shown with reference to FIG. 1. More specifically, FIG. 4A shows timing diagram 400 with values of N=1 and M=1, also referred to as a default timing diagram. FIG. 4B, however, shows timing diagram 410 where N=2 and M=1. In this situation, the number of advertising intervals (i.e., "2") corresponding to a specific scan interval is shown. FIG. 4C, however, shows timing diagram 420 where N=2 and M=2. In this situation, the number of advertising intervals (i.e., "2") corresponding to a specific scan interval is shown.

Figure 5:
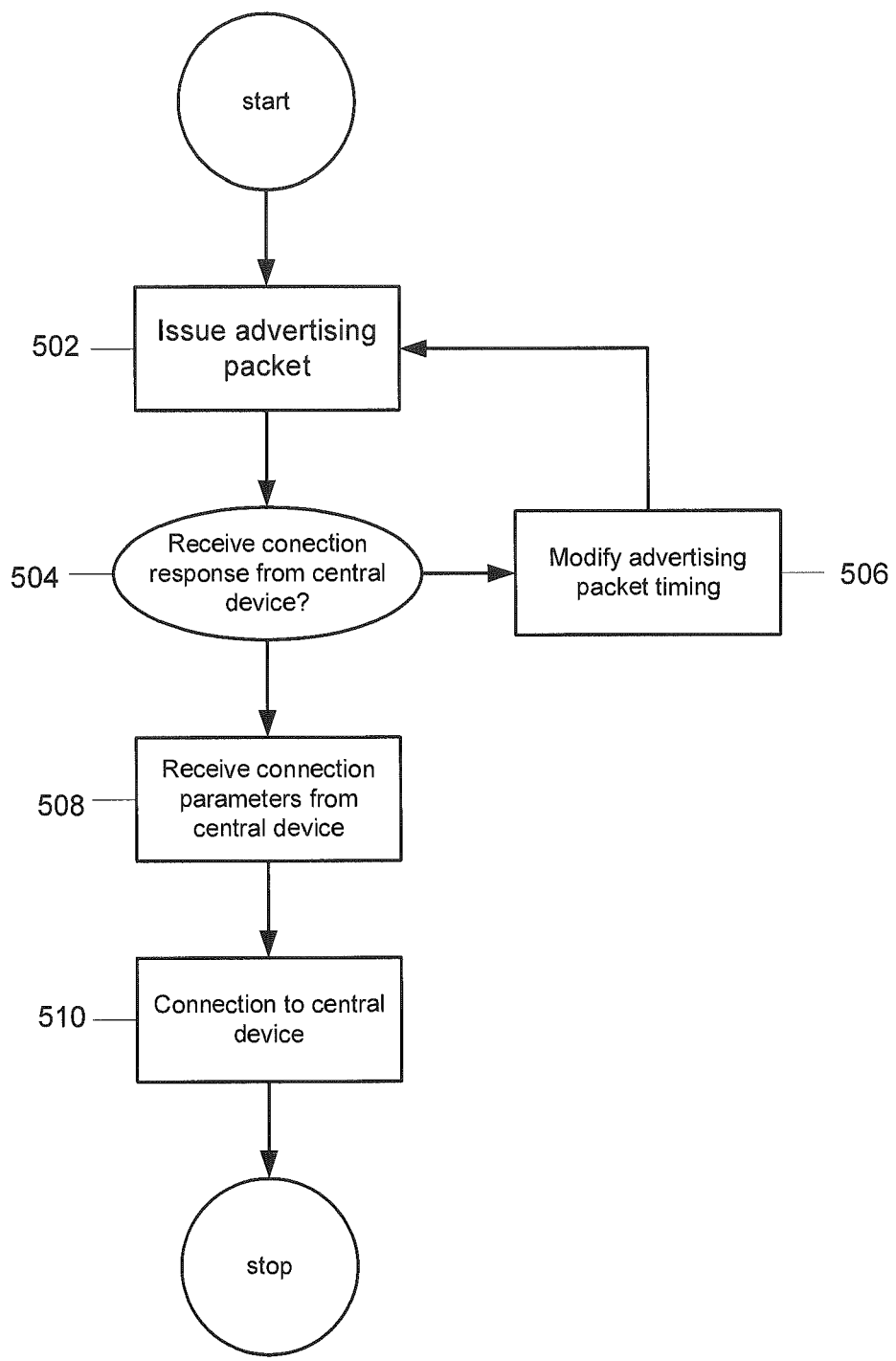
FIG. 5 shows a flowchart detailing process in accordance with the described embodiments.

FIG. 5 shows a flowchart detailing process 500 in accordance with the described embodiments. Process 500 can be carried out by performing at least the following operations: at 502 a peripheral device issues an advertising packet. At 504, if a connection response is not received from a central device, then advertising packet issuance parameters are modified at 506. The issuance parameters modification can be based upon a timing relationship in accordance with Equation (1). In particular, the advertising interval can be based upon the scanWindow value and a scanInterval value as well as integers N and M. In one embodiment, the scanWindow value and scanInterval values can be default values. In other cases, the default values can be those provided by a central device manufacturer. In any case, once the advertising packet timing parameters have been modified, control is passed back to 502 where another advertising packet is issued under the updated advertising packet timing parameters.

Returning back to 504, if the connection response is received, that at 508, connection parameters are received from the central device by the peripheral device. In one embodiment, the connection parameters can be a set of scanWindow and scanInterval values. The set of scanWindow and scanInterval values can be based upon, for example, an elapsed amount of time between connection events, power resources of the central device, and so on. For example, in one embodiment, a default scanWindow value can be 40 ms and a corresponding default scanInterval value can be 60 ms whereas if an amount of time has elapsed without a connection event having occurred, the scanWindow value can be updated to 30 ms while the scanInterval value remains unchanged. Further changes can include the scanInterval value being updated to 300 ms (while the scanWindow value remains at 30 ms) and in some cases, the scanWindow value updating to 12.5 ms corresponding to a scanInterval value of 1280 ms.

In this way, peripheral device can modify the relationship described by Equation (1) by using values of scanWindow and scanInterval that change in accordance with an operating state of the central device. In any case, once the peripheral device has received that updated central device parameters, the peripheral device and central device are wirelessly connected at 510.

Figure 6:
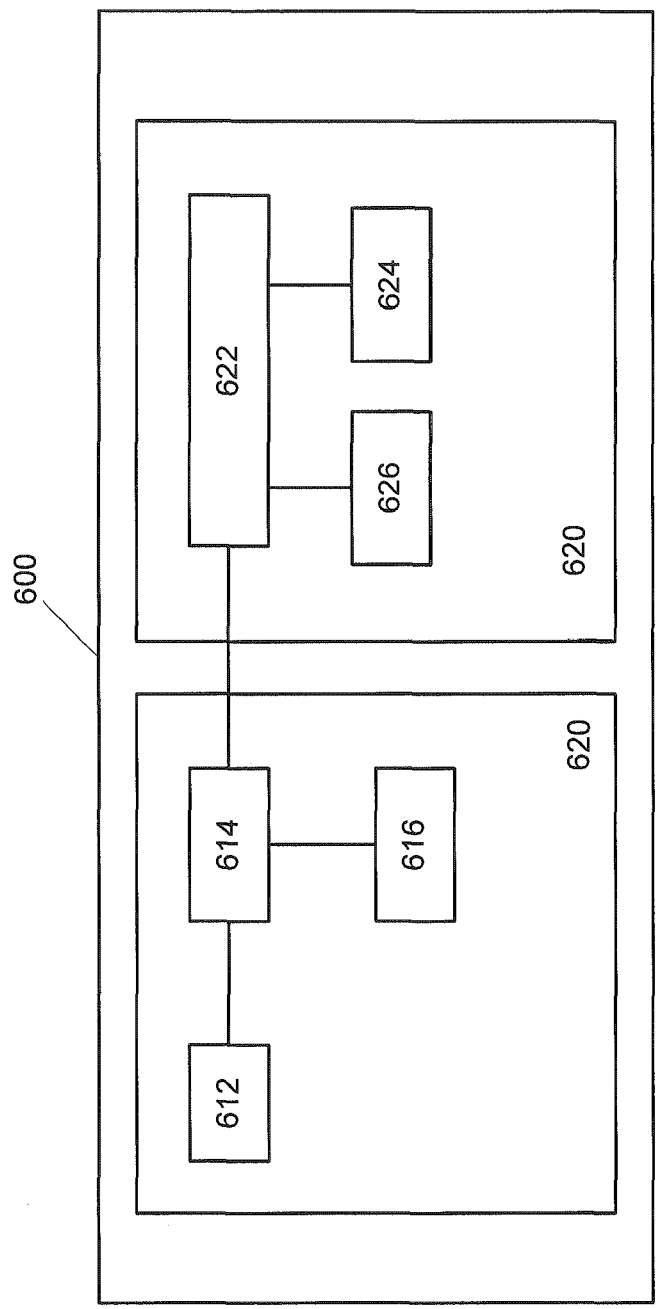
FIG. 6 is a diagram illustrating an exemplary BLE receiver that is operable to perform device filtering based on device class bits, in accordance with an embodiment of the invention.

FIG. 6 is a diagram illustrating an exemplary BLE receiver that is operable to perform device filtering based on device class bits, in accordance with a described embodiment. Referring to FIG. 6, there is shown a BLE receiver 600 that includes at least a BLE module 610 and a host 620. The BLE module 610 can include a BLE radio frequency (RF) front-end 612, a BLE baseband processor 614, and a BLE memory 616. The host 620 can include a host processor 622, a user interface 624, and a memory 626. The BLE module 610 can comprise suitable logic, circuitry, interfaces, and/or code that are operable to receive BLE signals. The BLE module 610 can be enabled to decode and process the received BLE signals. The BLE RF front-end 612 can comprise suitable logic, circuitry and/or code that enable receiving of BLE signals and converting the received BLE signals into BLE baseband signals.

The BLE baseband processor 614 can include suitable logic, circuitry, interfaces, and/or code that are operable to process BLE baseband signals from the BLE RF front-end 612 to extract the information and data bits conveyed in the received signal. The BLE baseband processor 614 can be operable to perform functions such as frequency synchronization, symbol timing estimation, demodulation, and/or decoding. When advertising channel packets such as advertising packets can be received, the BLE baseband processor 614 can be enabled to facilitate smart device filtering using a white list stored in the BLE memory 616. The white list can comprise device class bits of preferred BLE devices. The BLE baseband processor 614 can be enabled to extract device class bits from the received advertising packets and compare with the white list. The BLE baseband processor 614 can be enabled to process the received advertising packets if the extract device bits can be found in the white list. The BLE baseband processor 614 can be operable to discard the received advertising packets if no entry in the white list can be found to match the extracted device class bits. In addition, the BLE baseband processor 614 can be configured to wake up the host processor 622 whenever receiving advertising packets from advertisers in the white list. The BLE baseband processor 614 can be configured so that it does not to wake up the host processor 622 upon the reception of advertising packets from advertisers not in the white list.

The BLE memory 616 can comprise suitable logic, circuitry, and/or code that can be operable to store information such as executable instructions and data that can be utilized by the BLE baseband processor 614. The executable instructions can comprise executable instructions for turning on or off the host processor 622 based on device filtering for processing advertising packets. The BLE memory 616 can be enabled to store the white list for device filtering. The BLE memory 616 can comprise RAM, ROM, low latency nonvolatile memory such as flash memory and/or other suitable electronic data storage. The host processor 622 can comprise suitable logic, circuitry and/or code that can be enabled to process BLE baseband signals from the BLE baseband processor 614. The host processor 622 can be enabled to receive instructions from the BLE baseband processor 614 to start or stop processing advertising packets in received BLE baseband signals.

The user interface 624 can comprise suitable logic, circuitry, interfaces and/or code that can be enabled to service the BLE receiver 600 via entering user inputs and/or presenting various services to users. The memory 626 can comprise suitable logic, circuitry, and/or code that can be operable to store information such as executable instructions and data that can be utilized by the host processor 622. The executable instructions can comprise algorithms that can be applied to process BLE packs for various applications. The memory 626 can comprise RAM, ROM, low latency nonvolatile memory such as flash memory and/or other suitable electronic data storage. It should be noted that although a single BLE receiver 600 is illustrated in FIG. 6, the invention can not be so limited. Accordingly, the BLE receiver 600 can be utilized for receiving BLE signals in radio frequency (RF) bands by a BLE initiator and/or a BLE scanner. The BLE initiator and/or the BLE scanner can be a single mode BLE device and/or a dual-mode BLE device.

In operation, the BLE receiver 600 can be operable to receive BLE signals via the BLE RF front-end 612. The BLE RF front-end 612 can be operable to process received BLE signals and convert them into BLE baseband signals. The received BLE signals can comprise advertising channel packets such as advertising packets. A white list that includes device class bits of preferred device class bits can be used for device filtering. The BLE baseband processor 614 can be enabled to extract device class bits from the received advertising packets and compare them with the white list in the BLE memory 616. If the extracted device bits can be found in the white list, the BLE baseband processor 614 can continue to process the received advertising packets; otherwise, the received advertising packets can be discarded. The BLE baseband processor 614 can be configured to wake up the host processor 622 whenever receiving advertising packets from advertisers in the white list. The host processor 622 can be enabled to process the received advertising packets using algorithms in the memory 626 for various applications.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents can be resorted to as falling within the scope of the invention.

What is claimed is:

1. A method of processing signals, comprising:
performing by one or more processors and/or circuits in a Bluetooth low energy (BLE) device:
identifying a set of advertising packet issuance timing parameters;
issuing an advertising packet in accordance with the advertising packet issuance timing parameters; and
modifying the advertising packet issuance timing parameters when the BLE device does not receive a valid connection command in response to the issued advertising packet, the receiving of the packet enabling the BLE device to determine that a device that sent the connection command received and processed the advertising packet.

2. The method according to claim 1, wherein the modifying the advertising issuance timing parameters comprises:
modifying the advertising issuance timing parameters having a range in accordance with $$advIntervalH = \frac{scanInterval * N + 1.5 * scanWindow}{M} - \frac{advDelay}{2}$$

$$advIntervalL = \frac{scanInterval * N - 1.5 * scanWindow}{M} - \frac{advDelay}{2},$$

wherein N, M are natural integer numbers each having an integer value of at least 1 and wherein scanInterval is an amount of time corresponding to a scan interval and wherein scanWindow is an amount of time corresponding to a scan window each being associated with a central device.

3. The method according to claim 2, wherein the scanInterval and scanWindow are default values of the central device.

4. The method according to claim 2, wherein the scanInterval and scanWindow are updated in accordance with an operation state of the central device.

5. The method according to claim 4, wherein the advInterval value is modified in accordance with the updated values of scanInterval and scanWindow.

6. A wireless peripheral device, comprising:
a Bluetooth low energy (BLE) wireless interface; and
a processor coupled to the BLE wireless interface, the processor arranged to perform operations for:
identifying a set of advertising packet issuance timing parameters;
issuing an advertising packet in accordance with the advertising packet issuance timing parameters, and
modifying the advertising packet issuance timing parameters when the wireless peripheral device does not receive a valid connection command in response to the issued advertising packet, the receiving of the packet enabling the wireless peripheral device to determine that a device that sent the connection command received and processed the advertising packet.

7. The wireless peripheral device according to claim 6, wherein the modifying the advertising issuance timing parameters comprises:
modifying the advertising issuance timing parameters in accordance with $$advInterval = \frac{scanInterval * N + 1.5 * scanWindow}{M} - \frac{advDelay}{2},$$

wherein N, M are natural integer numbers each having an integer value of at least 1 and wherein scanInterval is an amount of time corresponding to a scan interval and wherein scanWindow is an amount of time corresponding to a scan window each being associated with a central device.

8. The wireless peripheral device according to claim 7, wherein the scanInterval and scanWindow are default values of the central device.

9. The wireless peripheral device according to claim 7, wherein the scanInterval and scanWindow are updated in accordance with an operation state of the central device.

10. The wireless peripheral device according to claim 9, wherein the advInterval value is modified in accordance with the updated values of scanInterval and scanWindow.

11. Non-transitory computer readable medium for storing computer code executable by a processor for processing signals, comprising:
computer code for performing by one or more processors and/or circuits in a Bluetooth low energy (BLE) device:
computer code for identifying a set of advertising packet issuance timing parameters;
computer code for issuing an advertising packet in accordance with the advertising packet issuance timing parameters; and
computer code for modifying the advertising packet issuance timing parameters when the BLE device does not receive a valid connection command in response to the issued advertising packet, the receiving of the packet enabling the wireless peripheral device to determine that a device that sent the connection command received and processed the advertising packet.

12. The computer readable medium according to claim 11, wherein the computer code for modifying the advertising issuance timing parameters comprises:
modifying the advertising issuance timing parameters in accordance with $$advInterval = \frac{scanInterval * N + 1.5 * scanWindow}{M} - \frac{advDelay}{2},$$

wherein N, M are natural integer numbers each having an integer value of at least 1 and wherein scanInterval is an amount of time corresponding to a scan interval and wherein scanWindow is an amount of time corresponding to a scan window each being associated with a central device.

13. The computer readable medium according to claim 12, wherein the scanInterval and scanWindow are default values of the central device.

14. The computer readable medium according to claim 12, wherein the scanInterval and scanWindow are updated in accordance with an operation state of the central device.

15. The computer readable medium according to claim 14, wherein the advInterval value is modified in accordance with the updated values of scanInterval and scanWindow.

* * * * *